（12） United States Patent
Jang et al.

(10) Patent No.: US 11,554,767 B2
(45) Date of Patent: Jan. 17, 2023

(54) ELECTRIC PARKING BRAKE ACTUATOR ASSEMBLY

(71) Applicant: KEYANG ELECTRIC MACHINERY CO., LTD., Seoul (KR)

(72) Inventors: Su Gil Jang, Hwaseong-si (KR); Ho Gun Lee, Hwaseong-si (KR); Jang Soo Park, Suwon-si (KR); Sang Hun Lee, Ansan-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 272 days.

(21) Appl. No.: 17/015,601

(22) Filed: Sep. 9, 2020

(65) Prior Publication Data

US 2021/0071727 A1 Mar. 11, 2021

(30) Foreign Application Priority Data

Sep. 10, 2019 (KR) .......................... 10-2019-0112334

(51) Int. Cl.
*B60T 13/74* (2006.01)
*B60T 7/02* (2006.01)
(Continued)

(52) U.S. Cl.
CPC ............ *B60T 13/741* (2013.01); *B60T 7/045* (2013.01); *F16D 65/16* (2013.01); *F16H 1/28* (2013.01);
(Continued)

(58) Field of Classification Search
CPC .......... F16H 1/28; F16H 57/02; F16H 57/021; F16H 57/03; F16H 57/031;
(Continued)

(56) References Cited

U.S. PATENT DOCUMENTS 9,297,433 B2 * 3/2016 Takewaki ................ F16D 65/18
9,410,590 B2 * 8/2016 Jang ....................... H02K 7/116
(Continued)

FOREIGN PATENT DOCUMENTS

EP   3712023 A1 * 9/2020 ............ B60T 13/741
EP   3712024 A1 * 9/2020 ............ B60T 13/746
(Continued)

OTHER PUBLICATIONS

Machine translation of KR 2018-0061540 A obtained on Aug. 1, 2022.*
(Continued)

*Primary Examiner* — Adam D Rogers
(74) *Attorney, Agent, or Firm* — Novick, Kim & Lee PLLC; Jae Youn Kim

(57) ABSTRACT

An electric parking brake actuator assembly is proposed. The electric parking brake actuator assembly includes: an outer housing including an inner space in which a gear installation space and a motor installation space are formed; an inner housing installed in the inner space of the outer housing, and including a brush card part and a gear installation part integrated together; a motor assembly coupled to the brush card part to be electrically connected thereto, and installed in the motor installation space; a gear assembly installed at the gear installation part and at the gear installation space, and changing and transmitting the rotational
(Continued)

speed of the motor assembly; and a cover housing coupled to the outer housing with the inner housing interposed therebetween, and including a shaft insertion portion.

12 Claims, 6 Drawing Sheets

(51) Int. Cl.
| | |
|---|---|
| *F16D 65/14* | (2006.01) |
| *F16H 1/28* | (2006.01) |
| *F16H 57/02* | (2012.01) |
| *F16D 65/16* | (2006.01) |
| *F16H 57/021* | (2012.01) |
| *F16H 57/03* | (2012.01) |
| *F16H 57/031* | (2012.01) |
| *B60T 7/04* | (2006.01) |
| *F16D 121/24* | (2012.01) |
| *F16D 125/50* | (2012.01) |

(52) U.S. Cl.
CPC ........... *F16H 57/02* (2013.01); *F16H 57/021* (2013.01); *F16H 57/03* (2013.01); *F16H 57/031* (2013.01); *F16D 2121/24* (2013.01); *F16D 2125/50* (2013.01); *F16H 2057/02034* (2013.01); *F16H 2057/02082* (2013.01)

(58) Field of Classification Search
CPC . F16H 2057/02034; F16H 2057/02082; F16D 65/16; F16D 2121/24; F16D 2125/50; B60T 7/045; B60T 13/741
See application file for complete search history.

(56) References Cited

U.S. PATENT DOCUMENTS

| | | | | |
|---|---|---|---|---|
| 9,616,862 | B2* | 4/2017 | Qi | B60T 13/746 |
| 10,843,675 | B2* | 11/2020 | Jang | B60T 7/045 |
| 10,876,587 | B2* | 12/2020 | Jang | H02K 1/17 |
| 10,960,866 | B2* | 3/2021 | Jang | F16D 55/226 |
| 2022/0017057 | A1* | 1/2022 | Lee | H02K 7/1166 |

FOREIGN PATENT DOCUMENTS

| | | | | |
|---|---|---|---|---|
| EP | 3715201 B1 * | 4/2022 | | B60T 13/741 |
| KR | 10-1041553 B1 | 6/2011 | | |
| KR | 10-1321719 B1 | 10/2013 | | |
| KR | 2014-0118037 A | 10/2014 | | |
| KR | 10-1606670 B1 | 3/2016 | | |
| KR | 10-1612677 B1 | 4/2016 | | |
| KR | 101688881 B1 * | 12/2016 | | |
| KR | 10-1701291 B1 | 2/2017 | | |
| KR | 2018-0061540 A | 6/2018 | | |
| KR | 20180061549 A * | 6/2018 | | |
| KR | 10-2019-0047173 A | 5/2019 | | |
| KR | 20210000083 A * | 1/2021 | | |

OTHER PUBLICATIONS

Machine translation of KR 2019-0047173 A obtained on Aug. 1, 2022.*

* cited by examiner

ELECTRIC PARKING BRAKE ACTUATOR ASSEMBLY

CROSS REFERENCE TO RELATED APPLICATION

The present application claims priority to Korean Patent Application No. 10-2019-0112334, filed Sep. 10, 2019, the entire contents of which is incorporated herein for all purposes by this reference.

BACKGROUND OF THE INVENTION

Field of the Invention

The present disclosure relates generally to an electric parking brake actuator assembly and, more particularly, to an electric parking brake actuator assembly with a simplified internal structure.

Description of the Related Art

An electric parking brake actuator of a vehicle is for operating a friction pad installed at a caliper of a disc brake assembly during vehicle parking. An electric parking brake (EPB) is automatically operated in response to a user's switch operation, and for this purpose, the EPB is composed of an electric parking brake motor and a gear assembly (power transmission unit) for transmitting power of the motor. During the vehicle parking, the EPB is used in the following manner: torque of the motor of the actuator is transmitted to an input shaft of the caliper through the gear assembly (power transmission unit) such as a reduction gear when a driver presses a parking brake switch; when the input shaft having received power is rotated, a pressurizing connection sleeve is moved forward, and the forward movement of the pressurizing connection sleeve causes a piston accommodated therein and a caliper housing to be moved closer to each other; and two friction pads mounted on the piston and the caliper housing press opposite sides of the disc thereby causing the disc to be restrained not to rotate.

However, since the actuator is composed of a plurality of rotary parts and these rotary parts are rotated in meshing engagement with each other, tolerance management is important. If the center distance between rotary shafts is out of an allowable range due to cumulative tolerances between parts, quality problems such as performance degradation or noise may occur. In particular, vibration of the motor generated during operation leads to shaking of parts such as gears due to such cumulative tolerances, which lowers durability of the gears, resulting in lowering durability of a product.

This is because when assembling parts such as the built-in motor and gears, precise axis alignment therebetween is difficult. In particular, a gear assembly (or gear box) for a deceleration function is a separate unit from a motor assembly, and has a large number of internal parts, so tolerance management is difficult due to cumulative tolerances, which makes it more difficult to ensure axis alignment between parts spaced apart from each other.

In addition, since the actuator has a large number of built-in parts, the number of processes required to assemble each part increases, resulting in an increase in manufacturing time and manufacturing cost, which is problematic.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent No. 10-1041553

SUMMARY OF THE INVENTION

Accordingly, the present disclosure has been made keeping in mind the above problems occurring in the related art, and an objective of the present disclosure is to reduce the number of parts and to secure a space to simplify the internal structure of an electric parking brake actuator assembly.

In order to achieve the above objective, according to one aspect of the present disclosure, there is provided an electric parking brake actuator assembly, including: an outer housing including an inner space in which a gear installation space and a motor installation space are respectively formed; an inner housing installed in the inner space of the outer housing, and including a brush card part and a gear installation part integrated together into the inner housing; a motor assembly coupled to the brush card part to be electrically connected thereto, and installed in the motor installation space; a gear assembly installed at the gear installation part and at the gear installation space, and changing and transmitting a rotational speed of the motor assembly; and a cover housing coupled to the outer housing with the inner housing interposed therebetween, and including a shaft insertion portion recessed in a surface thereof.

The gear assembly may include: a shaft gear installed between the brush card part and the cover housing and rotated in conjunction with rotation of the motor assembly; an idle gear changed in rotational speed while being rotated in meshing engagement with the shaft gear with respect to the idle shaft; an idle reduction gear formed integrally with the idle gear and having a smaller diameter than the idle gear; a secondary reduction gear changed in rotational speed while being rotated in meshing engagement with the idle reduction gear with respect to the reduction shaft; a sun gear coupled to or integrally formed with the secondary reduction gear and having a smaller diameter than the secondary reduction gear; a planetary gear assembly changed in rotational speed while being rotated in meshing engagement with the sun gear; and a ring gear circumscribing the planetary gear assembly to allow planetary gears to revolve.

The gear installation part may include a partition plate that has a plate shape conforming to a shape of an opening of the inner space and defines an exterior contour of the gear installation part, and the partition plate may have a first surface on which the secondary reduction gear and the idle gear are supported, and an opposite second surface to which the planetary gear assembly and the ring gear are assembled.

A gear through-hole may be formed in a center of the partition plate to allow the sun gear to pass therethrough.

The shaft insertion portion may include: an idle shaft insertion portion into which a first end of the idle shaft is inserted and supported; and a reduction gear shaft insertion portion into which an end of the reduction shaft is inserted and supported.

A shaft recess may be formed in the partition plate to be recessed at a position corresponding to the idle shaft insertion portion, and a second end of the idle shaft may be inserted into and supported by the shaft recess.

A stepped portion may be formed at a position between the brush card part and the gear installation part of the inner housing so that a height difference may occur between the brush card part and the gear installation part, and the brush card part may be formed at a relatively higher position than the gear installation part by the stepped portion.

A partition fence may be formed at the inner housing to prevent lubricating oil applied to the gear assembly from flowing into the brush card part.

An accommodation fence may be formed at the cover housing in a shape conforming to a shape of the partition fence.

The partition fence and the accommodation fence may be formed in shapes surrounding edges of the shaft gear and idle gear, respectively.

A housing coupling end may be formed to be stepped outwardly along an opening edge of the outer housing, and a cover coupling end may be formed along an edge of the cover housing so that the housing coupling end and the cover coupling end may be laser-welded with the cover coupling end being in close contact with an outer surface of the housing coupling end.

A raised portion may be formed on an outer surface of the cover housing to compensate for a thickness of the cover housing which becomes thin as the shaft insertion portion is formed to be recessed.

Reinforcing ribs for increasing a structural strength of the cover housing may be formed on an inner surface of the cover housing in a grid shape or a honeycomb shape.

Reinforcing raised ribs may be formed on the inner surface of the cover housing at a relatively narrower interval than the reinforcing ribs at positions in the vicinity of the shaft insertion portion or at positions corresponding to the raised portion.

The electric parking brake actuator assembly according to the present disclosure as described above has the following effects.

According to the present disclosure, since provision of an inner cover covering an upper portion of the gear assembly in the related art is eliminated and the idle shaft insertion portion and the reduction gear shaft insertion portion are formed in the cover housing itself, the number of parts is reduced, and the resulting cumulative tolerances are reduced. In addition, there is an effect of reducing the total number of assembly processes.

According to the present disclosure, since a brush card that is assembled after being made separately in the related art is made integrally with the inner housing, there is an effect of reducing the total number of assembly processes and making tolerance regulation easier.

According to the present disclosure, since the idle gear is integrally formed with the idle gear to undergo an additional deceleration process, the number of planetary gear assemblies is reduced. There thus is an effect of reducing the number of parts and reducing production cost. There is another effect of solving the problem of cumulative tolerances due to a reduction in the number of parts and reducing the total number of assembly processes.

According to the present disclosure, the accommodation fence formed on the cover housing and the partition fence formed on the inner housing prevent lubricating oil applied to the shaft gear and the bearing of the motor assembly from flowing into the brush card. Thus, there is an effect of stably operating the brush card part integrated with the inner housing.

According to the present disclosure, the housing coupling end is formed to be stepped outwardly so that the housing coupling end and the cover coupling end are laser-welded with the cover coupling end being in close contact with an outer surface of the housing coupling end. Thus, buns generated during welding do not enter the inside of the outer housing, and thereby there is an effect of reducing defects caused by buns.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
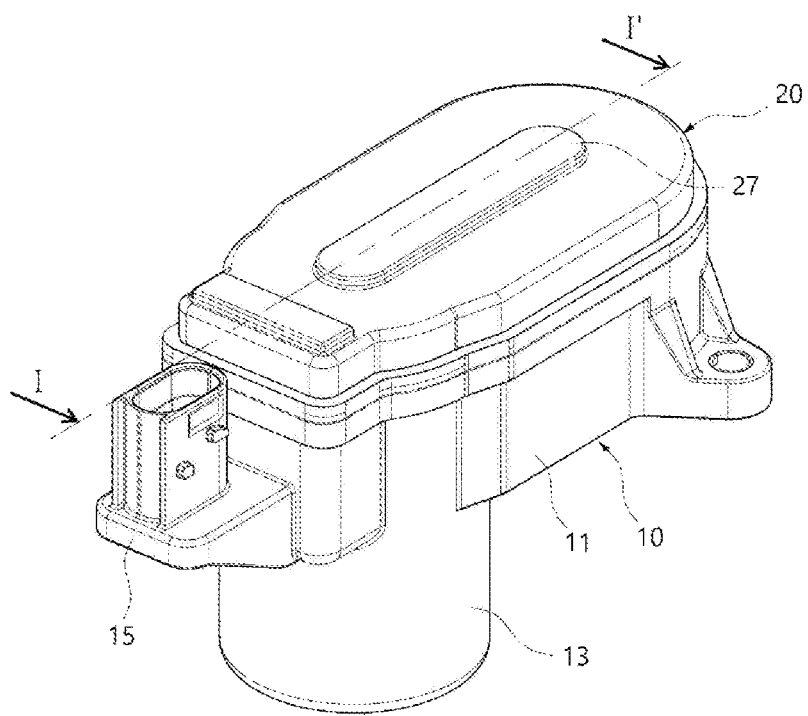
FIG. 1 is a perspective view illustrating an embodiment of an electric parking brake actuator assembly according to the present disclosure.

Hereinafter, an exemplary embodiment of the present disclosure will be described with reference to the accompanying drawings. As for reference numerals associated with parts in the drawings, the same reference numerals will refer to the same or like parts throughout the drawings. Further, in the following description, detailed descriptions of known functions and configurations incorporated herein will be omitted when it may make the subject matter of the present disclosure unclear.

Further, when describing the components of the present disclosure, terms such as first, second, A, B, (a), or (b) may be used. Since these terms are provided merely for the purpose of distinguishing the components from each other, they do not limit the nature, sequence, or order of the components. It should be understood that when an element is referred to as being "coupled", "connected", or "joined" to another element, it can be directly coupled, connected, or joined to the other element or intervening elements may be present therebetween.

An electric parking brake actuator assembly (hereinafter referred to as "actuator") according to the present disclosure may generate a large torque by decelerating driving of a motor, and transmit the torque externally of the actuator to realize an electric parking brake function. To this end, a gear assembly may be installed in conjunction with the motor inside the actuator according to the present disclosure. The gear assembly described below refers to an overall structure composed of a plurality of gears, and may include a shaft gear 1', an idle gear 2, a secondary reduction gear 4, a planetary gear assembly 6, and a ring gear 7.

Figure 2:
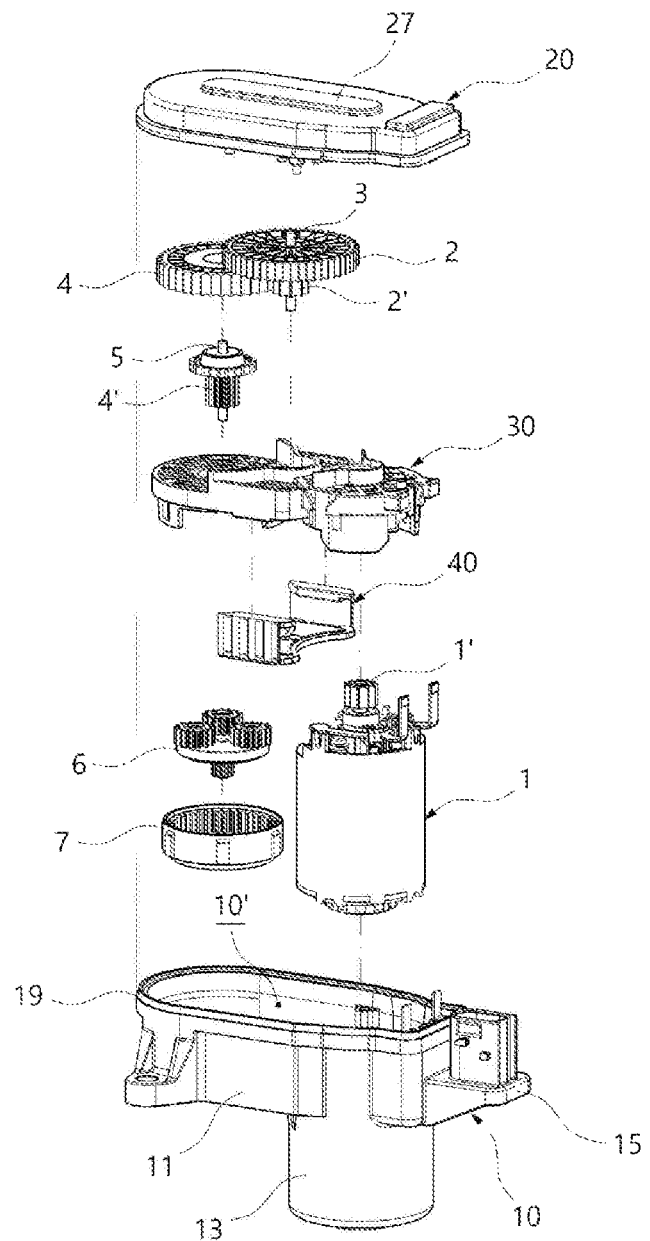
FIG. 2 is an exploded perspective view illustrating the embodiment of FIG. 1.
Figure 7:
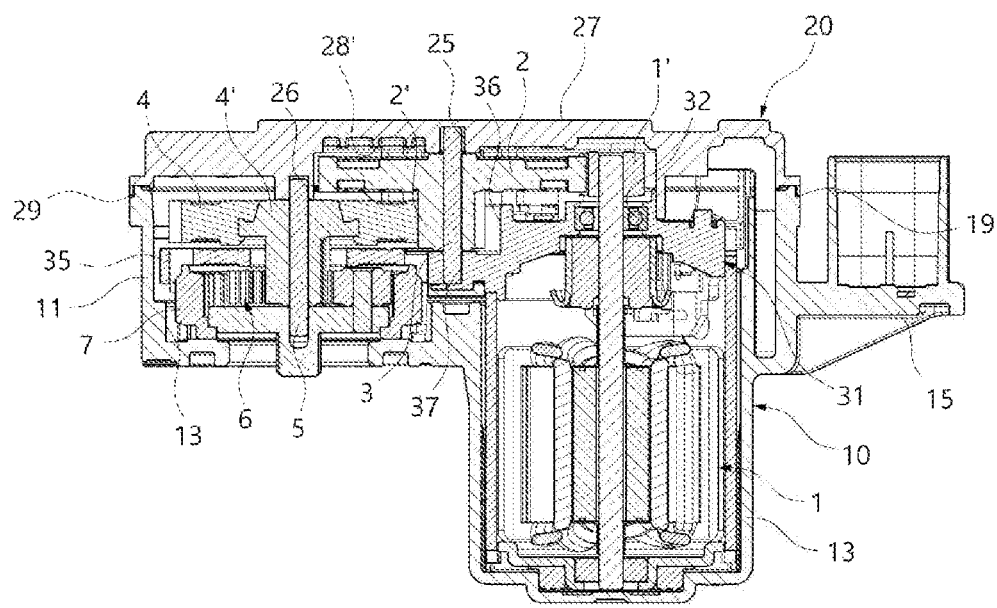
FIG. 7 is a sectional view, taken along line of FIG. 1.

Referring to FIGS. 2 and 7, a deceleration motion of the gear assembly will be described. When torque is generated in a motor assembly 1, the shaft gear 1' connected to the motor assembly 1 by a rotary shaft may be rotated. The shaft gear 1' may be in meshing engagement with the idle gear 2, and thus, the idle gear 2 may be rotated in conjunction with the rotation of the shaft gear 1'. Here, the idle gear 2 may have a relatively larger diameter and more teeth than the shaft gear 1'. Thus, in the process of transmitting power from the shaft gear 1' to the idle gear 2, a reduction in rotational speed may be primarily made.

The idle gear 2 may be integrally formed with an idle reduction gear 2' sharing an idle shaft 3 therewith. The idle reduction gear 2' may be formed to protrude from a surface of the idle gear 2 and may be rotated at the same rotational speed as the idle gear 2. However, the idle reduction gear 2' has a smaller diameter than the idle gear 2 and thus has fewer teeth than the idle gear 2.

The idle reduction gear 2' may be in meshing engagement with a secondary reduction gear 4. The secondary reduction gear 4 may be rotated in conjunction with the rotation of the idle reduction gear 2'. The secondary reduction gear 4 may have a relatively larger diameter and more teeth than the idle reduction gear 2'. Thus, in the process of transmitting power from the idle reduction gear 2' to the secondary reduction gear 4, a reduction in rotational speed may be secondarily made.

A sun gear 4' may be formed to protrude from a surface of the secondary reduction gear 4. The sun gear 4' may be rotated at the same rotational speed as the secondary reduction gear 4, but have a smaller diameter than the secondary reduction gear 4. The planetary gear assembly 6 may be assembled to the sun gear 4', and the planetary gear assembly 6 may be rotated in meshing engagement with the sun gear 4' in a circumscribed state, so that a reduction in rotational speed may be thirdly made. Here, the ring gear 7 may be installed to circumscribe a plurality of planetary gears constituting the planetary gear assembly 6, and thus, the plurality of planetary gears can revolve around the sun gear 4'.

Referring to FIG. 1, the outer housing 10 and the cover housing 20 may be coupled together to define an exterior contour of the actuator. As illustrated in FIG. 2, the motor assembly 1 and the gear assembly may be assembled in the outer housing 10, with the inner housing 30 interposed between the outer housing 10 and the cover housing 20. The inner housing 30 may support the motor assembly 1 and the gear assembly, and at the same time have a brush card part 31 integrally formed in the inner housing 30 so that the motor assembly 1 may be electrically connected to outside through a connector 15.

The configuration of the actuator constituting the exemplary embodiment of the present disclosure will be described with reference to the accompanying drawings.

Figure 3:
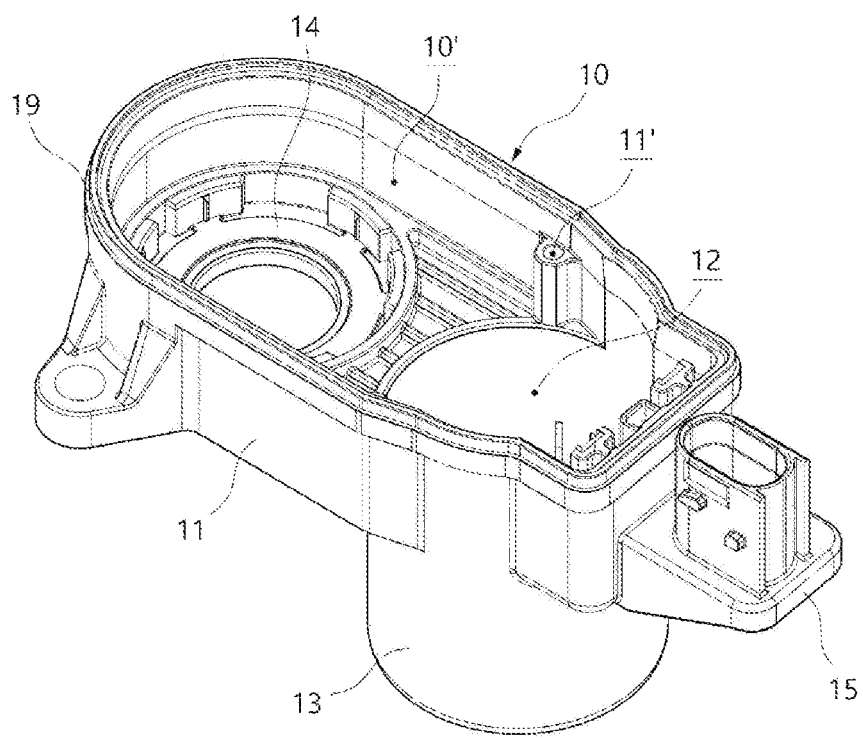
FIG. 3 is a perspective view illustrating the configuration of an outer housing constituting the embodiment of the present disclosure.

FIG. 3 illustrates the shape of the outer housing 10. The outer housing 10 may include an inner space 10' surrounded by a side wall 11 so that a side thereof may be open. The inner space 10' may include a motor installation space 12 and a gear installation space 14. The motor installation space 12 may be defined by a motor housing 13 protruding from the outer housing 10, and may allow the motor assembly 1 to be inserted thereinto.

The gear installation space 14 may allow the planetary gear assembly 6 and the ring gear 7 to be placed therein. The ring gear 7 may include a mechanical fastening means so as to be secured in place without rotation within the gear installation space 14.

A coupling hole 11' may be formed at a position inside the side wall 11 to be mechanically coupled to the cover housing 20. The cover housing 20 may have a coupling protrusion 21' formed at a position corresponding to the coupling hole 11'.

The connector 15 may be formed on an outer surface of the outer housing 10. The connector 15 may be formed on the side wall 11 at a position in the vicinity of the motor housing 13, and a terminal (not illustrated) inside the connector 15 may be electrically connected to the motor assembly 1. The rotational speed or torque of the motor assembly 1 may be controlled through the connector 15.

A housing coupling end 19 may be formed at an end of the side wall 11 along an opening edge of the inner space 10'. The housing coupling end 19 may be formed to be stepped outwardly of the outer housing 10 from the end of the side wall 11. With the cover housing 20 placed on the housing coupling end 19, the outer housing 10 and the cover housing 20 may be permanently coupled together so that the outer housing 10 and the cover housing 20 cannot be disassembled. The outer housing 10 and the cover housing 20 may be integrated by performing laser welding along the housing coupling end 19.

Figure 4:
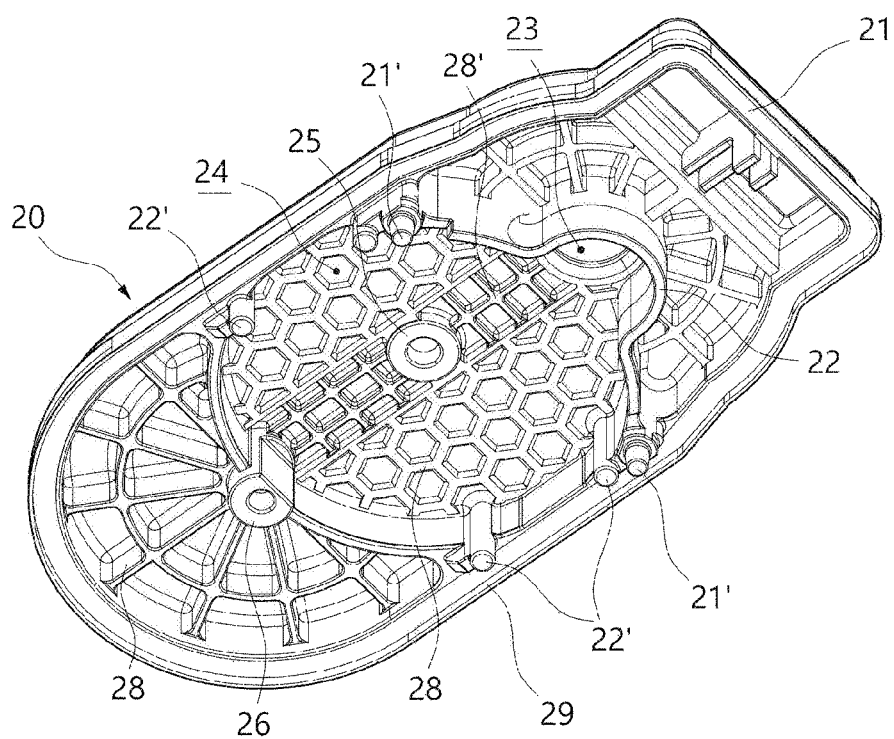
FIG. 4 is a perspective view illustrating the configuration of a cover housing constituting the embodiment of the present disclosure.

Referring to FIG. 4, the cover housing 20 includes a cover plate 21 defining an exterior contour of the cover housing 20. The cover plate 21 may be formed to have a shape conforming to the shape of an opening of the inner space 10' to cover the opening of the inner space 10'. In addition, the cover plate 21 supports respective shafts of the idle gear 2 and the secondary reduction gear 4. An idle shaft insertion portion 25 and a reduction gear shaft insertion portion 26, which will be described later, may be formed on the cover plate 21 so that the shaft of the idle gear 2 and the shaft of the secondary reduction gear 4 may be directly supported by the cover plate 21.

A plurality of coupling protrusions 21' may protrude from the cover plate 21 in a coupling direction with the outer housing 10. Each of the coupling protrusions 21' may be formed at a position corresponding to the coupling hole 11' of the outer housing 10, and the coupling protrusions 21' and the respective coupling holes 11' may be coupled together to temporarily secure the outer housing 10 and the cover housing 20 together.

An accommodation fence 22 may be formed on the cover plate 21. The accommodation fence 22 may isolate a space in which the shaft gear 1' provided on the rotary shaft of the motor assembly 1 and the idle gear 2 in meshing engagement with the shaft gear 1' are accommodated. Accordingly, the accommodation fence 22 may be formed in a shape surrounding the edge of a structure in which the shaft gear 1' and the idle gear 2 are in meshing engagement with each other. Since the accommodation fence 22 may surround the edges of the shaft gear 1' and the idle gear 2, meshing engagement between the shaft gear 1' and the idle gear 2 may be made uniformly without eccentricity, and the resulting noise and vibration may be reduced. In addition, the accommodation fence 22 may block lubricating oil, which is applied to the gear assembly to facilitate rotation of the gear assembly, from flowing into the brush card part 31 of the inner housing 30.

A fence reinforcing portion 22' may be further formed on the accommodation fence 22. The fence reinforcing portion 22' may be a portion in which a portion of the accommodation fence 22 is formed to be thicker than a remaining portion, and may increase the structural strength of the accommodation fence 22 itself. As illustrated in FIG. 4, the fence reinforcing portion 22' may be formed in a cylindrical shape at an intermediate portion of the accommodation fence 22. However, the shape of the fence reinforcing portion 22' is not limited to a cylinder, since it is only necessary to form a portion of the accommodation fence 22 to be thicker.

A first gear accommodation space 23 and a second gear accommodation space 24 may be formed in the cover plate 21 at positions inside the accommodation fence 22. The shaft gear 1' provided on the rotary shaft of the motor assembly 1 may be accommodated in the first gear accommodation space 23, and the idle gear 2 may be accommodated in the second gear accommodation space 24.

The shaft gear 1' may be accommodated in the first gear accommodation space 23. The shaft gear 1' may be connected to the rotary shaft extending from the motor assembly 1, and thus, the shaft gear 1' may not be supported by the cover plate 21.

The idle gear 2 may be accommodated in the second gear accommodation space 24, and the idle shaft insertion portion 25 may be formed in the center of the second gear accommodation space 24. A first end of the idle shaft 3, which is the center of rotation of the idle gear 2, may be inserted into and supported by the idle shaft insertion portion 25. The idle shaft insertion portion 25 may be formed to be recessed to allow the insertion the idle shaft 3.

In addition, the reduction gear shaft insertion portion 26 may be formed at a position outside the second gear accommodation space 24. The reduction gear shaft insertion portion 26 may be formed on the accommodation fence 22. An end of a reduction shaft 5, which is a rotary shaft of the secondary reduction gear 4, which is in meshing engagement with the idle reduction gear 2' of the idle gear 2 to lower the rotational speed of the motor assembly 1, may be inserted into and supported by the reduction gear shaft insertion portion 26. The reduction gear shaft insertion portion 26 may be formed to be recessed to allow the insertion of the reduction shaft 5.

By the idle shaft insertion portion 25 and the reduction gear shaft insertion portion 26 formed on the cover plate 21, the number of parts may be reduced, and the resulting cumulative tolerances may be reduced. In addition, there may be an effect of reducing the total number of assembly processes.

FIGS. 1 and 2 illustrate a raised portion 27 formed on the cover plate 21. The raised portion 27 may be formed to partially protrude from a surface, that is, an outer surface of the cover plate 21, opposite to the surface on which the idle shaft insertion portion 25 and the reduction gear shaft insertion portion 26 of the cover plate 21 are formed. The raised portion 27 may be formed to compensate for the thickness of the cover plate 21 which becomes thin as the idle shaft insertion portion 25 and reduction gear shaft insertion portion 26 are formed to be recessed. Accordingly, the raised portion 27 may be formed at a position corresponding to the idle shaft insertion portion 25 and the reduction gear shaft insertion portion 26 to prevent the cover plate 21 from becoming thin.

Reinforcing ribs 28 may be formed on the cover plate 21. The reinforcing ribs 28 may be added on the entire surface of the cover plate 21 to increase the structural strength of the cover plate 21. The reinforcing ribs 28 may be formed in various shapes such as a grid shape or a honeycomb shape.

Reinforcing raised ribs 28' may be formed at positions inside the accommodation fence 22. The reinforcing raised ribs 28' may be formed at positions in the vicinity of the idle shaft insertion portion 25 and the reduction gear shaft insertion portion 26, or at positions corresponding to the raised portion 27. The reinforcing raised ribs 28' may be formed at a relatively narrower interval than the reinforcing ribs 28 to increase the structural strength of the cover plate 21. The reinforcing raised ribs 28' may absorb a part of vibration generated due to the rotation of the idle shaft 3 and the reduction shaft 5.

A cover coupling end 29 may be formed along the edge of the cover plate 21. The cover coupling end 29 may be coupled to the housing coupling end 19 to form an exterior contour of the actuator. Since the housing coupling end 19 may be formed to be stepped outwardly of the outer housing 10 from the end of the side wall 11, the outer surfaces of the outer housing 10 and the cover housing 20 may be connected to each other without a gap to form a smooth contour when the cover coupling end 29 and the housing coupling end 19 are coupled together. The outer housing 10 and the cover housing 20 may be integrated by performing laser welding along the cover coupling end 29. While vibration welding, which is used as a conventional joining method, is problematic in that excessive buns are generated between the outer housing 10 and the cover housing 20 being joined, laser welding may reduce the generation of buns. In addition, by a structure in which the cover coupling end 29 may be positioned outside the housing coupling end 19 and the cover coupling end 29 may be formed to be stepped, even if buns are generated during laser welding along the cover coupling end 29, the buns may not flow into the inner space 10' by the housing coupling end 19.

Figure 5:
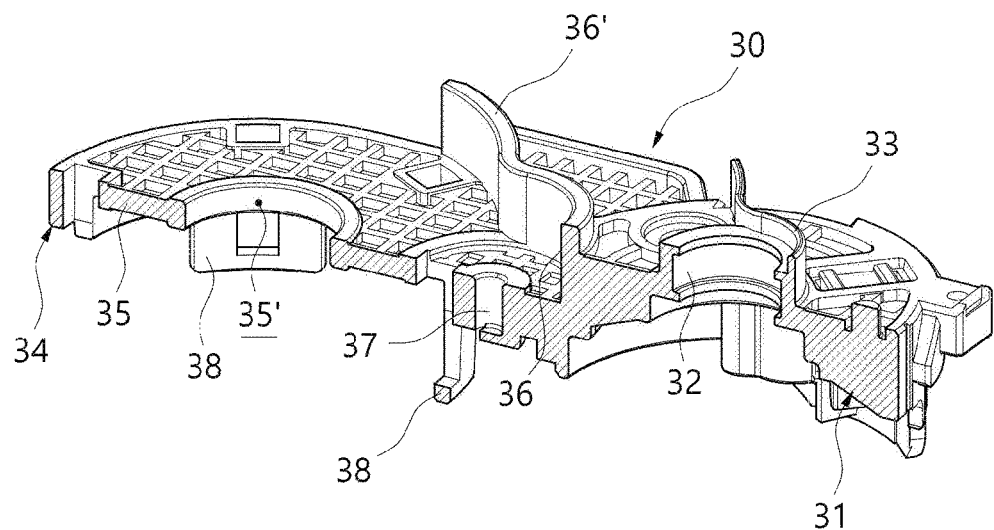
FIG. 5 is a sectional perspective view illustrating the configuration of an inner housing constituting the embodiment of the present disclosure.

FIG. 5 illustrates a sectional perspective view of the inner housing 30. The inner housing 30 may be installed at a position between the outer housing 10 and the cover housing 20. The inner housing 30 may serve to secure in place parts constituting the gear assembly. The inner housing 30 may have a shape conforming to the shape of the opening of the inner space 10' and may be coupled to the opening of the inner space 10' to cover the opening. The inner housing 30 may include the brush card part 31 electrically connected to the motor assembly 1 and a gear installation part 34 to which the gear assembly is secured.

The brush card part 31 may be integrally formed in the inner housing 30. A terminal electrically connected to the motor assembly 1 may be installed at the brush card part 31. The brush card part 31 may transmit power to be applied to the motor assembly 1, and control the rotational speed of the motor assembly 1. It is preferable that the terminal installed at the brush card part 31 is installed at a position outside a partition fence 33.

A bearing seat end 32 may be formed on the brush card part 31. The bearing seat end 32 may be formed at a position where the rotary shaft extending from the motor assembly 1 passes through the brush card part 31.

The shaft gear 1' of the motor assembly 1 may be placed and rotated in the brush card part 31, and the partition fence 33 may be formed on the brush card part 31 in a shape surrounding the edge of the shaft gear 1'. The partition fence 33 may conform to the shape of the accommodation fence 22. The partition fence 33 may isolate the gear assembly from the terminal installed at the brush card part 31 to prevent the lubricating oil applied to the gear assembly from flowing into the brush card part 31.

The gear installation part 34 may be formed integrally with the brush card part 31, and may include a partition plate 35 defining an exterior contour of the gear installation part 34. The partition plate 35 may be formed in a plate shape conforming to the shape of the opening of the inner space 10'. The partition plate 35 may have a first surface on which the secondary reduction gear 4 and the idle gear 2 are supported, and an opposite second surface to which the planetary gear assembly 6 and the ring gear 7 are assembled.

That is, the secondary reduction gear 4 and the planetary gear assembly 6 may be installed at positions isolated from each other with respect to the partition plate 35. This structure may support the secondary reduction gear 4 and the idle gear 2 thereby imparting axial stability to the gears and preventing eccentric rotation thereof.

A gear through-hole 35' may be formed in the center of the partition plate 35. The gear through-hole 35' may allow the sun gear 4' formed on the secondary reduction gear 4 to pass therethrough. The sun gear 4' passing through the gear through-hole 35' may be rotated in meshing engagement with the planetary gear assembly 6 installed on the opposite second surface of the partition plate 35, so that a reduction in rotational speed may be thirdly made.

A stepped portion 36 may be formed at a position between the brush card part 31 and the partition plate 35 so that a height difference may occur between the brush card part 31 and the partition plate 35. The stepped portion 36 may be formed in a shape conforming to the shape of the idle gear 2 and the idle reduction gear 2' in order to accommodate a shape in which the idle gear 2 and the idle reduction gear 2' are integrally formed with each other.

The brush card part 31 may be formed at a relatively higher position than the partition plate 35 by the stepped portion 36. This structure may prevent the lubricating oil from flowing into the brush card part 31. That is, the height difference between the brush card part 31 and the partition plate 35 may serve the same role as the partition fence 33.

A support fence 36' may be further formed on the stepped portion 36. The support fence 36' may be continuously formed along the stepped portion 36. The support fence 36' may be formed to surround a part of the edge of each of the idle reduction gear 2' and the secondary reduction gear 4 so that meshing engagement between the idle reduction gear 2' and the secondary reduction gear 4 may be made uniformly without eccentricity.

A shaft recess 37 may be formed in the partition plate 35 to allow a second end of the idle shaft 3 to be supported therein. The shaft recess 37 may be recessed at a position corresponding to the idle shaft insertion portion 25, so that the first end of the idle shaft 3 may be inserted into and supported by the idle shaft insert portion 25 while the second end of the idle shaft 3 may be inserted into and supported by the shaft recess 37. In order to compensate for the thickness of the partition plate 35 at a portion where the shaft recess 37 is formed, a portion peripheral to the shaft recess 37 of the partition plate 35 may be formed thicker than a remaining portion.

A fastening skirt 38 may extend from the partition plate 35 in a direction in which the sun gear 4' is inserted into the gear through-hole 35'. The fastening skirt 38 may be coupled to the ring gear 7, and the planetary gear assembly 6 may be installed at a position inside the ring gear 7.

Figure 6:
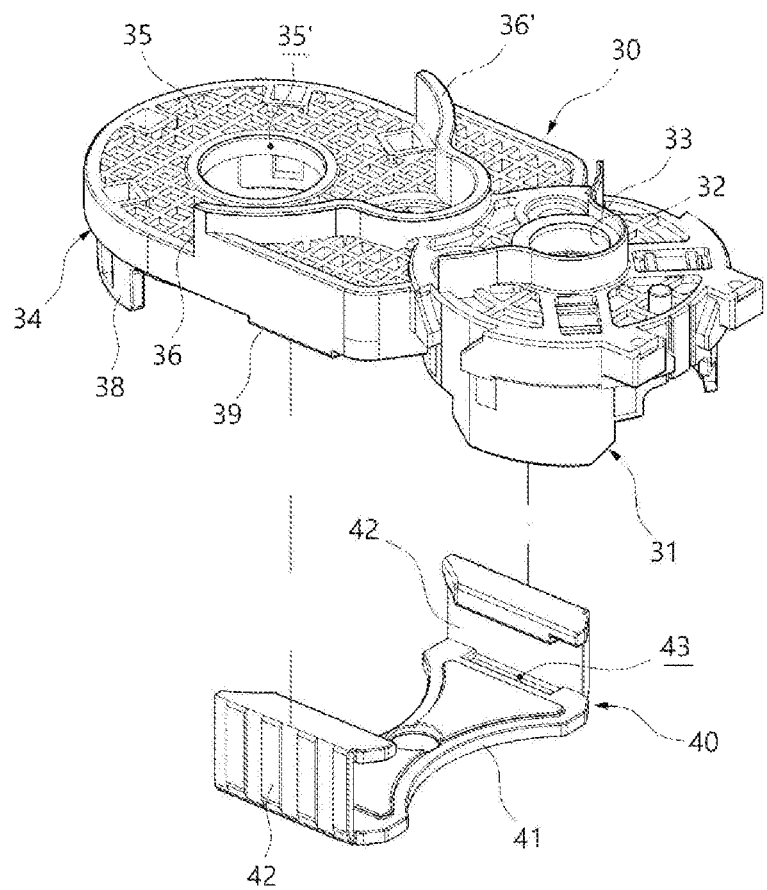
FIG. 6 is a perspective view illustrating configurations of the inner housing and a reinforcing part constituting the embodiment of the present disclosure.

Referring to FIG. 6, a reinforcing member 40 may be further assembled to an intermediate portion of the inner housing 30. The reinforcing member 40 may be made of a metal material and may be formed to have a predetermined elasticity. The reinforcing member 40 may be formed to surround an outer surface of the inner housing 30. The reinforcing member 40 may include a reinforcing body 41 coming into close contact with a side of the outer surface of the inner housing 30, and opposite walls 42 vertically bent at opposite sides of the reinforcing body 41, respectively. The walls 42 may surround opposite sides of the outer surface of the inner housing 30, with respective ends thereof bent parallel to the reinforcing body 41.

An assembly groove 43 may be formed at each of opposite edges of the reinforcing body 41 to be coupled to an assembly protrusion 39 formed on the inner housing 30. The coupling between the assembly protrusion 39 and the assembly groove 43 may increase coupling force between the reinforcing member 40 and the inner housing 30.

Next, a process of assembling the actuator constituting the preferred embodiment of the present disclosure will be described.

First, the motor assembly 1 may be installed in the brush card part 31 through the bearing seat end 32, and the shaft gear 1' may be coupled to the motor assembly 1. At this time, a bearing may be in a state seated in the bearing seat end 32. At the same time, the planetary gear assembly 6 may be placed inside the ring gear 7, and the fastening skirt 38 of the inner housing 30 and the ring gear 7 may be coupled together. Either of the motor assembly 1 and the ring gear 7 may be assembled first.

When the motor assembly 1, the planetary gear assembly 6, and the ring gear 7 are installed at the inner housing 30, the inner housing 30 may be inserted into the inner space 10' of the outer housing 10. The ring gear 7 may be coupled to the gear installation space 14, and the motor assembly 1 may be placed into the motor housing 13.

With the inner housing 30 installed in the outer housing 10, the secondary reduction gear 4 and the idle gear 2 may be sequentially installed, after which the reduction shaft 5 of the secondary reduction gear 4 and idle shaft 3 may be installed. When the installation of the idle gear 2 and the secondary reduction gear 4 is completed, the cover housing 20 may be placed over the gear assembly, and the cover coupling end 29 and the housing coupling end 19 may be laser-welded and integrated together.

Even though it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. In addition, since terms, such as "including", "comprising", and "having" mean that one or more corresponding components may exist unless they are specifically described to the contrary, it shall be construed that one or more other components can be included. Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the embodiment of the present disclosure has been described for illustrative purposes, those skilled in the art will appreciate that various modifications, additions and substitutions are possible, without departing from the scope and spirit of the present disclosure as disclosed in the accompanying claims. Accordingly, the embodiment disclosed in the present disclosure is not to limit but is merely to describe the technical spirit of the present disclosure. Further, the scope of the technical spirit of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An electric parking brake actuator assembly, comprising:
    an outer housing including an inner space in which a gear installation space and a motor installation space are respectively formed;
    an inner housing installed in the inner space of the outer housing, and including a brush card part and a gear installation part integrated together into the inner housing;
    a motor assembly coupled to the brush card part to be electrically connected thereto, and installed in the motor installation space;
    a gear assembly installed at the gear installation part and at the gear installation space, and changing and transmitting a rotational speed of the motor assembly; and
    a cover housing coupled to the outer housing with the inner housing interposed therebetween, and including a shaft insertion portion recessed in a surface thereof,
    wherein a partition fence is formed at the inner housing to prevent lubricating oil applied to the gear assembly from flowing into the brush card part, and
    wherein an accommodation fence is formed at the cover housing in a shape conforming to a shape of the partition fence.

2. The electric parking brake actuator assembly of claim 1, wherein the gear assembly comprises:
    a shaft gear installed between the brush card part and the cover housing and rotated in conjunction with rotation of the motor assembly;
    an idle gear changed in rotational speed while being rotated in meshing engagement with the shaft gear with respect to an idle shaft;
    an idle reduction gear formed integrally with the idle gear and having a smaller diameter than the idle gear;
    a secondary reduction gear changed in rotational speed while being rotated in meshing engagement with the idle reduction gear with respect to a reduction shaft;
    a sun gear coupled to or integrally formed with the secondary reduction gear and having a smaller diameter than the secondary reduction gear;
    a planetary gear assembly changed in rotational speed while being rotated in meshing engagement with the sun gear; and
    a ring gear circumscribing the planetary gear assembly to allow planetary gears to revolve.

3. The electric parking brake actuator assembly of claim 2, wherein the gear installation part comprises a partition plate conforming to a shape of an opening of the inner space and defines an exterior contour of the gear installation part.

4. The electric parking brake actuator assembly of claim 3, wherein a stepped portion is formed at a position between the brush card part and the gear installation part of the inner housing so that a height difference occurs between the brush card part and the gear installation part, and
    the brush card part is formed at a higher position than the gear installation part by the stepped portion.

5. The electric parking brake actuator assembly of claim 3, wherein a gear through-hole is formed in a center of the partition plate to allow the sun gear to pass therethrough.

6. The electric parking brake actuator assembly of claim 5, wherein the shaft insertion portion comprises:
    an idle shaft insertion portion into which a first end of the idle shaft is inserted and supported; and
    a reduction gear shaft insertion portion into which an end of the reduction shaft is inserted and supported.

7. The electric parking brake actuator assembly of claim 6, wherein a shaft recess is formed in the partition plate to be recessed at a position corresponding to the idle shaft insertion portion, and a second end of the idle shaft is inserted into and supported by the shaft recess.

8. The electric parking brake actuator assembly of claim 1, wherein the partition fence and the accommodation fence are formed in shapes surrounding edges of the shaft gear and idle gear, respectively.

9. The electric parking brake actuator assembly of claim 1, wherein a housing coupling end is formed to be stepped outwardly along an opening edge of the outer housing, and
    a cover coupling end is formed along an edge of the cover housing so that the housing coupling end and the cover coupling end are laser-welded with the cover coupling end being in contact with an outer surface of the housing coupling end.

10. The electric parking brake actuator assembly of claim 9, wherein a raised portion is formed on an outer surface of the cover housing to compensate for a thickness of the cover housing.

11. The electric parking brake actuator assembly of claim 10, wherein reinforcing ribs for increasing a structural strength of the cover housing are formed on an inner surface of the cover housing in a grid shape or a honeycomb shape.

12. The electric parking brake actuator assembly of claim 11, wherein reinforcing raised ribs are formed on the inner surface of the cover housing at a narrower interval than the reinforcing ribs at positions in a vicinity of the shaft insertion portion or at positions corresponding to the raised portion.

* * * * *